(No Model.) 7 Sheets—Sheet 1.
J. R. ROWLANDS.
CAN CAPPING MACHINE.

No. 557,610. Patented Apr. 7, 1896.

Fig. 1

WITNESSES:
C. E. Tomlinson
A. M. Benedict

INVENTOR
John R. Rowlands
By E. Laass
ATTORNEY (No Model.) 7 Sheets—Sheet 3.

J. R. ROWLANDS.
CAN CAPPING MACHINE.

No. 557,610. Patented Apr. 7, 1896.

WITNESSES:

INVENTOR
John R. Rowlands
By E. Laass
ATTORNEY (No Model.) 7 Sheets—Sheet 4.

J. R. ROWLANDS.
CAN CAPPING MACHINE.

No. 557,610. Patented Apr. 7, 1896.

WITNESSES:
C. E. Tomlinson
A. M. Benedict

INVENTOR
John R. Rowlands
By E. Laass
ATTORNEY (No Model.)  7 Sheets—Sheet 7.

J. R. ROWLANDS.
CAN CAPPING MACHINE.

No. 557,610. Patented Apr. 7, 1896.

WITNESSES:

INVENTOR:
John R. Rowlands
By E. Laass
his ATTORNEY

UNITED STATES PATENT OFFICE.

JOHN R. ROWLANDS, OF SYRACUSE, NEW YORK, ASSIGNOR OF ONE-HALF TO GEORGE H. H. ADAMS, OF SAME PLACE.

CAN-CAPPING MACHINE.

SPECIFICATION forming part of Letters Patent No. 557,610, dated April 7, 1896.

Application filed April 22, 1895. Serial No. 546,623. (No model.)

*To all whom it may concern:*

Be it known that I, JOHN R. ROWLANDS, of Syracuse, in the county of Onondaga, in the State of New York, have invented new and useful Improvements in Can-Capping Machines, of which the following, taken in connection with the accompanying drawings, is a full, clear, and exact description.

This invention consists in a novel organization of a machine which is superior in its efficiency of soldering the caps of the cans in a very expeditious and perfect manner and at the same time is very economical in the use of the solder required for said purpose, said machine being also equipped with devices for automatically cleaning the soldering-iron and possessing numerous advantages over other machines employed for soldering the caps to tin cans, as hereinafter described, and set forth in the claims.

In the accompanying drawings.

Similar letters and figures of reference indicate corresponding parts.

Figure 4:
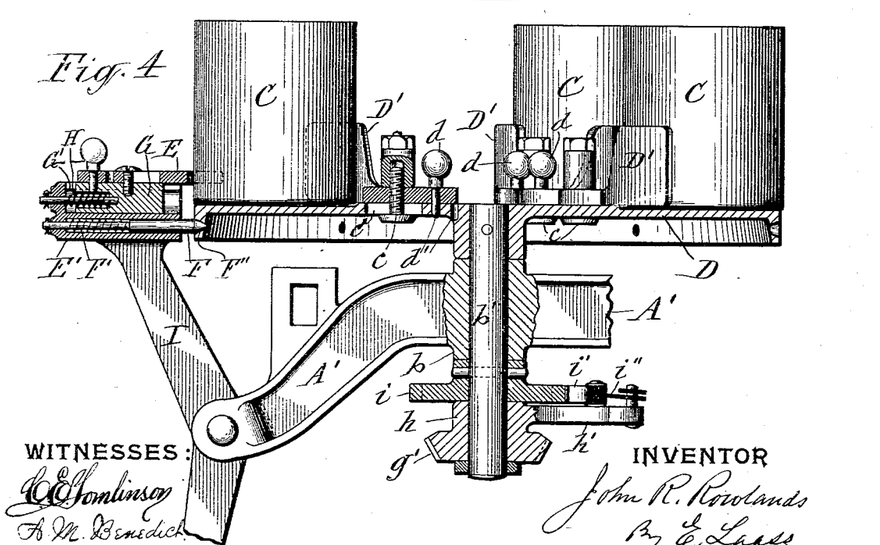
Fig. 4 is a transverse section on line X X in Fig. 3.

A represents a stout metal column or standard, which is preferably made hollow for the purpose hereinafter explained. The column, with arms or brackets, hereinafter referred to, constitutes the frame on which the mechanisms of the machine are mounted. A bracket A', secured to the lower portion of the aforesaid column, is formed with a vertical sleeve $b$, in which is journaled a shaft $b'$, to the upper end of which is secured the turn-table D, upon which are carried the cans C C to be capped, as more clearly shown in Fig. 4 of the drawings. Upon the said table are V-shaped jaws D' D', in which the cans are supported at one side and by which they are confined to a uniform distance from the center of the table. To adapt the machine for capping cans of different diameters, I make the jaws D' D' adjustable radially or toward and from the center of the table D by forming said jaws separate from the table and fastening them thereto by means of bolts $c$, which have their shanks passing through radial slots $c'$, as shown in Fig. 4 of the drawings. Said slots allow the jaws to be shifted toward and from the center of the table, as may be desired. A pin $d$ passing through the base of each jaw and entering one of a plurality of sockets $d'$ in the table confines said jaw in its required position.

Figure 2:
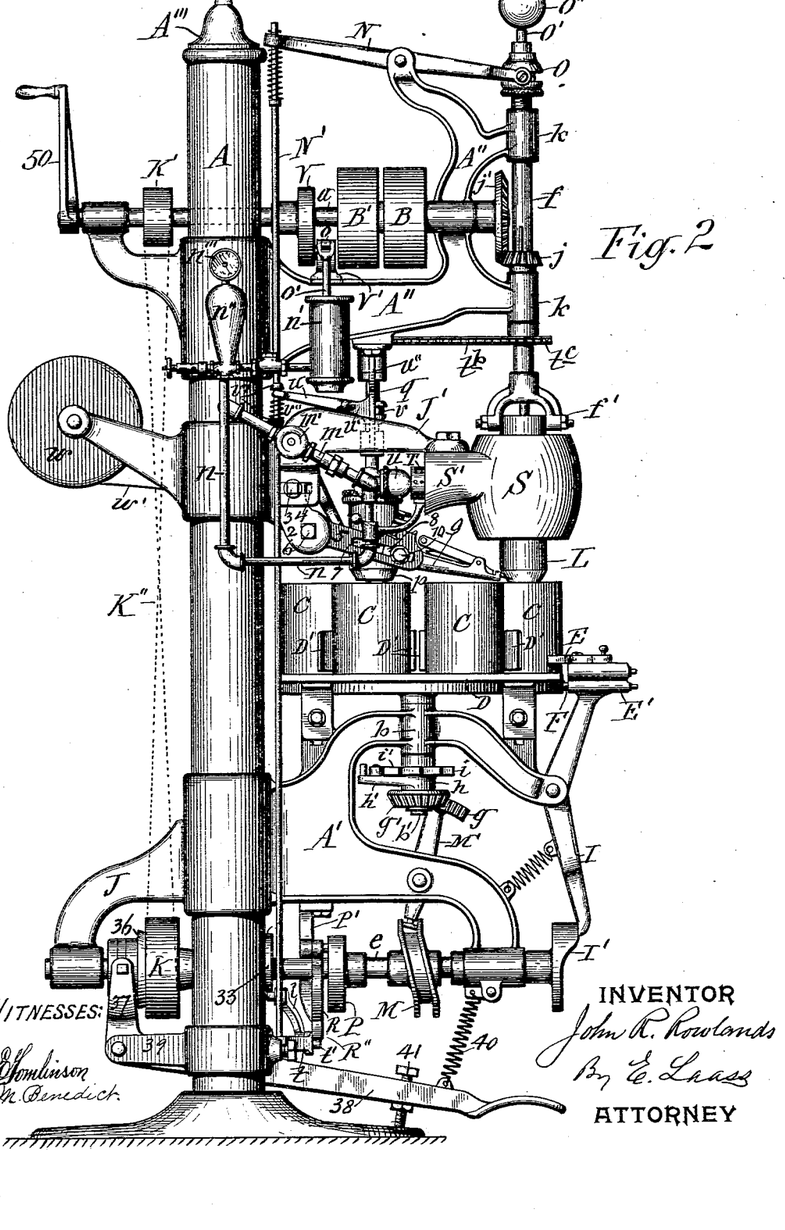
Figure 3:
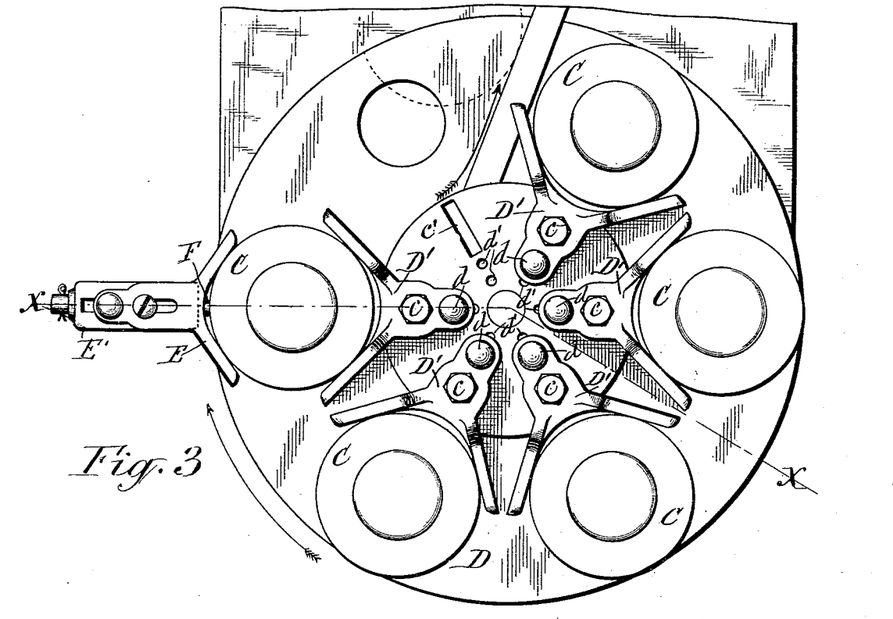
Fig. 3 is an enlarged plan view of the can-supporting table, taken in a plane beneath the line Z Z in Fig. 1.

To sustain the can central under the soldering-iron, hereinafter described, I place under the front of said soldering-iron a grip E, which is also of the form of a V-shaped jaw and movable radially in relation to the turn-table D, so as to press the can against the opposite jaw D', and thereby adjust and confine the can central under the soldering-iron, as shown in Fig. 2 of the drawings. To more effectually insure this centering operation, I provide the carrier E' of the grip E with a bolt F, which slides in said carrier and is guided in a line radially to the turn-table and is backed by a spring F', which forces the bolt toward the turn-table and causes said bolt to enter a socket F'' in the edge of the table.

To guard against excessive pressure on the side of the can, I attach the grip E to a slide G seated in a guide G' formed in the carrier E'. A spring H back of the slide G allows the grip to yield when subjected to the aforesaid pressure. The carrier E' is secured to one end of a rock-arm I, by which it is moved at regular intervals toward and from the turn-table D. Said rock-arm is pivoted to the bracket A' and has its opposite or lower end held in contact with a rotary cam I', which is attached to a horizontal shaft $e$ journaled in bearings on the bracket A' and on an arm J extending from the bracket in the opposite direction from the column A, as shown in Figs. 1 and 2 of the drawings.

The shaft $e$ receives rotary motion from the driving-shaft $a$ by pulleys K and K' attached to said shafts and connected by a driving-belt, (indicated by dotted lines K''.) B and B' designate the driving-pulley and loose pulley mounted on the shaft $a$.

L represents the rotary soldering-iron, which is connected to the lower end of the rotary and intermittently-reciprocating shaft $f$ by a detachable coupling $f'$ to allow soldering-irons of different sizes to be attached.

Figure 1:
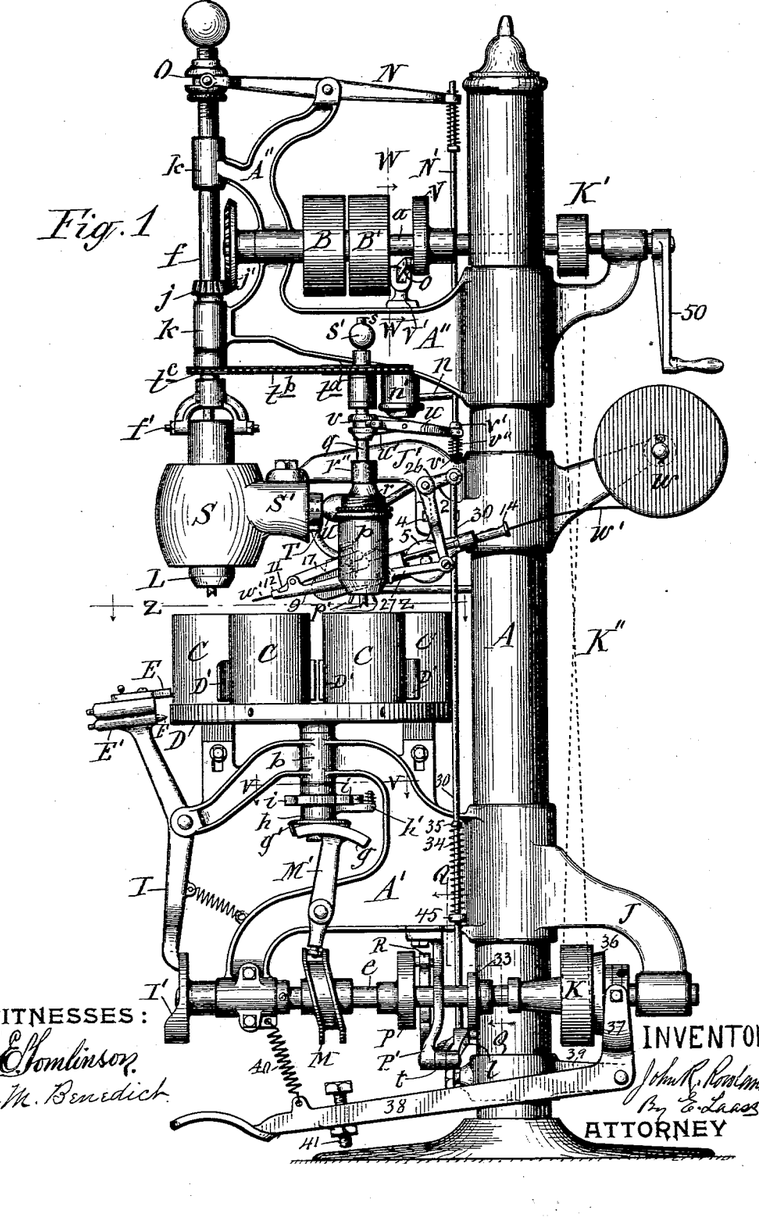
Figures 1 and 2 are elevations of opposite sides of a machine embodying my invention.

The turn-table D is moved intermittently to carry the cans C C successively under the soldering-iron L and is timed to place the can under said soldering-iron while the latter is in its elevated position, as represented in Fig. 1 of the drawings. This movement of the turn-table is obtained by the following mechanisms, viz: To the shaft $e$ is fastened the cam M, which imparts oscillatory motion to a lever M' pivoted to the bracket A'. This lever has affixed to it a segmental gear $g$, which meshes with a pinion $g'$ fastened to a hub $h$, which is loosely connected to the shaft $b'$ of the turn-table, as more readily seen in Fig. 4 of the drawings. To the shaft $b'$ is fastened a ratchet-wheel $i$, and on an arm $h'$ formed on the hub $h$ is pivoted a pawl $i'$, which by means of a spring $i''$ is held engaged with the ratchet-wheel, as fully shown in Fig. 14 of the drawings. The oscillations imparted to the pinion $g'$ by the lever M' causes the pawl $i'$ to intermittently turn the ratchet-wheel, which carries with it the turn-table D.

The soldering-iron receives rotary motion by means of a beveled pinion $j$ on the shaft $f$, meshing with a correspondingly-beveled gear $j'$ attached to the driving-shaft $a$. The shaft $f$ is journaled in vertical sleeves $k$ $k$ on the bracket A'' attached to the upper portion of the column A, and in order to permit said shaft to move vertically during its rotary motion the pinion $j$ is fitted loosely to the shaft, and the shaft $f$ is provided with a spline sliding in a groove in the hub of the pinion.

Figure 12:
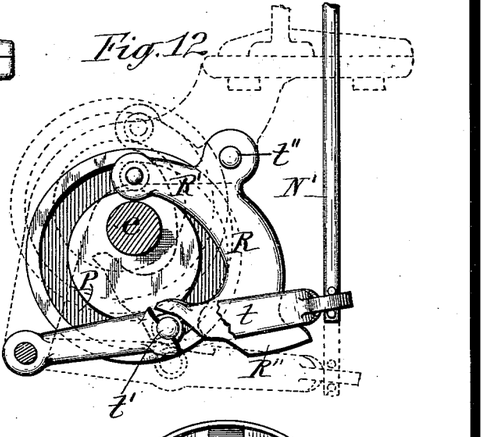
Fig. 12 is the same view with the adjacent cam removed.

The vertical movement is imparted to the soldering-iron by the following mechanisms: On the bracket A'' is fulcrumed a lever N, one end of which is bifurcated and straddles a circumferentially-grooved collar O fastened to the shaft $f$. To the bifurcated portion of said lever are secured suitable lugs or studs which project into the groove of the collar O to allow the lever to lift and depress the shaft. The lever N is connected by a rod N' to one end of a short lever $t$, which is pivoted at its opposite end to a bracket P' secured to the bracket A'. On the shaft $e$, hereinbefore referred to, is mounted an eccentric P, and to the bracket P' is pivoted a rock-arm R, as shown at $t''$. This rock-arm is formed with an elbow extension R', which engages the eccentric P and thereby imparts an oscillatory motion to the rock-arm. The free end of this rock-arm is formed with a prolonged base R'', which rides on a roller $t'$ pivoted to the central portion of the lever $t$, as shown in Fig. 12 of the drawings. The bearing-surface of the base R'' is at such an angle in relation to a radial line drawn from the pivot $t''$ and of such a contour as to cause said base to intermittently depress the lever $t$ during the oscillation of the rock-arm R, said lever being normally lifted by the weight of the shaft $f$ with the soldering-iron L attached to said shaft, by which weight the lever N is caused to draw up the rod N'. The oscillations thus imparted to the lever $t$ causes the soldering-iron L to be carried at regular intervals to and from the can placed under said iron.

Longitudinally through the tubular shaft $f$ and through the center of the soldering-iron extends the usual rod O', provided with the weight O'', by which the lower end of said rod is made to bear with sufficient pressure on the cap placed on the can to be soldered, said weight also serving as a stop which causes the shaft $f$ to lift with the rod O' during the rising of the soldering-iron from the can.

Figures 17, 18, 19, 20:
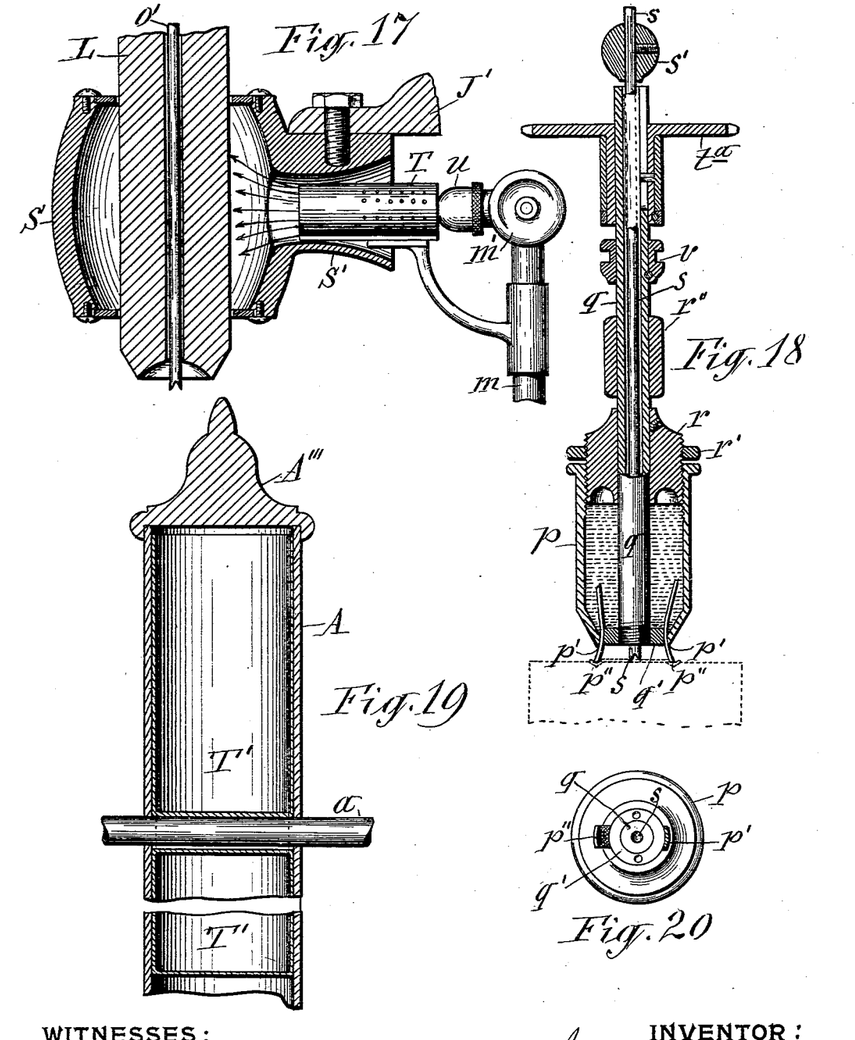
Fig. 17 is a vertical transverse section of the combustion-hood surrounding the soldering-iron.
Fig. 18 is a vertical transverse section of the acid-supplier.
Fig. 19 is a longitudinal section of the oil-can and its support.
Fig. 20 is a plan view of the lower end of the acid-supplier.

The soldering-iron is surrounded by the usual combustion-hood S, which is formed with the mouth S', into which projects the combustion-tube T, as more clearly shown in Fig. 17 of the drawings.

The requisite flame to be forced through the tube T into the hood S is produced by a jet of kerosene-oil or other suitable inflammable fluid mixed with a current of air within the tube T.

U denotes the nozzle from which the jet of oil or fluid mixed with the air-current is ejected, said nozzle being disposed in line with the axis of the tube T.

The oil or fluid is supplied from a tank or reservoir T', which I preferably place inside of the upper portion of the tubular column A, which is closed by a removable cap A''', as illustrated in Fig. 19 of the drawings, whereby the oil or fluid is safely housed. A pipe $m$ provided with a stop-cock $m'$ leads from the said reservoir to the nozzle T. $n$ denotes the air-supply pipe, which intersects the pipe $m$ and receives the air from a pump $n'$, preferably through an intermediate air-chamber $n''$, which serves to render the current more uniform. By a gage $n'''$ attached to the air-chamber $n''$ the pressure of the air is ascertained.

Figures 13, 14, 15, 16:
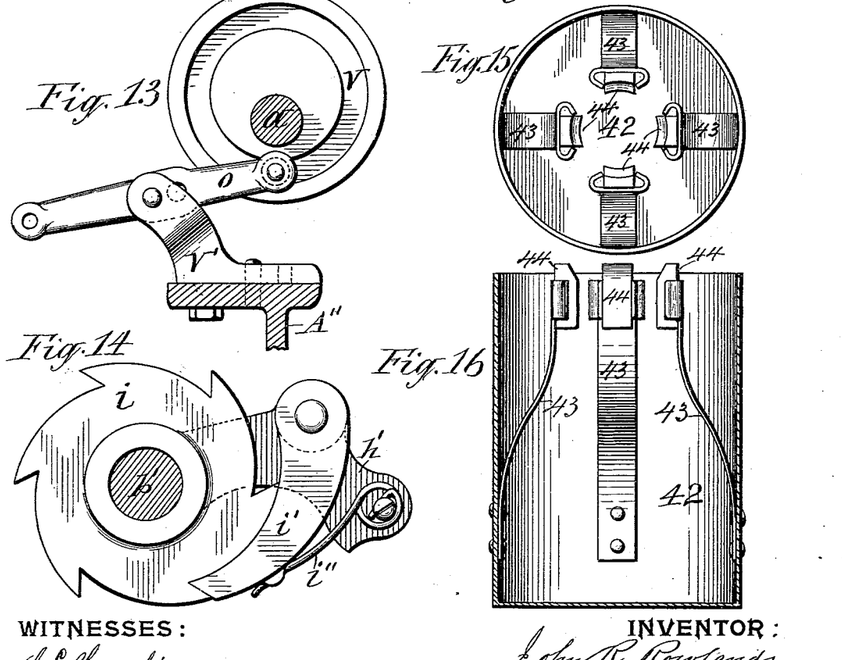
Fig. 13 is an enlarged transverse section on line W W in Fig. 1, viewed toward the right of the figure.
Fig. 14 is an enlarged horizontal transverse section on line V V in Fig. 1.
Fig. 15 is a top plan view of the device for cleaning the soldering-iron.
Fig. 16 is a vertical transverse section of the same.

For operating the pump $n'$ I attach to the shaft $a$ an eccentric V and pivot to a suitable support V' on the bracket A'' a lever $o$, one end of which engages the eccentric to receive oscillatory motion therefrom, as clearly seen in Fig. 13 of the drawings. The opposite end of the lever $o$ is connected to the stem $o'$ of the pump-piston.

For applying the necessary flux to the joint to be soldered I employ a suitable rotary reservoir $p$ containing the flux and provided with suitable discharge-ducts for spreading the flux evenly and accurately around the aforesaid joint preparatory to passing the can to the soldering-iron L. Said reservoir may be provided with a perforated bottom similar to the cap of a pepper-box to discharge pulverized rosin, if desired; but in order to render the operation more cleanly I prefer to construct the reservoir $p$ so as to adapt it for the use of a suitable acid in lieu of rosin. For this purpose I provide the bottom of the reservoir with ducts $p'$, through which protrude wicks $p''$, as more fully shown in Figs. 18 and 20 of the drawings. To allow the egress of acid to be regulated, I form the ducts $p'$ in the edge of a circular orifice in the bottom of the reservoir and screw-thread the lower end of the tubular rod $q$, by which the said reservoir is suspended, and onto said end of the rod screws the stopper $q'$, the periphery of which is tapered upward, and thus by turning said stopper so as to move upward on the rod the stopper can be made to pinch the wicks to permit the desired flow of acid or completely stop said flow, as may be desired.

The reservoir $p$ is closed at its top by a hub $r$, which is screw-threaded externally and enters a correspondingly screw-threaded portion in the interior of the upper end of the reservoir.

The jam-nut $r'$ on the hub can be screwed down onto the upper edge of the reservoir to prevent the latter from working loose on the hub.

The rod $q$ slides and revolves in a vertical guide $r''$ attached to an arm J', which is screwed to the column A and also supports the combustion-hood S. In the tubular rod $q$ slides the rod $s$, which normally projects from the bottom of the tube $q$ and is supported in said position by a weight $s'$ attached to the upper end of the rod $s$ and resting normally on the upper end of the tube $q$. When the reservoir $p$ is lowered to bring the wicks $p''$ to bear on the top of the can, the lower end of the rod $s$ bears on the center of the cap to hold it in position during the operation of supplying the acid.

The reservoir $p$ receives rotary motion by means of a sprocket-wheel $ta$ attached to the tubular rod $q$ and connected by a sprocket-chain $tb$ to another sprocket-wheel $tc$ attached to the rotary shaft $f$. I do not, however, limit myself to these specific means of transmitting rotary motion to said reservoir, as it is obvious that such motion may be derived from other moving mechanism of the machine. The vertically-reciprocating motion is imparted to the aforesaid reservoir by an oscillatory lever $u$ pivoted to an arm $u'$ on a vertical bracket $u''$, which is attached at opposite ends to the bracket A'' and arm J'. Both ends of said lever are bifurcated, and one end thereof engages a circumferential groove in a collar $v$ attached to the tubular rod $q$. The opposite end of the lever straddles the vertical rod N', which is provided with collars $v'$ $v'$ above and below the lever and has a spring $v''$ interposed between the lever and lower collar to vary downward pressure of the reservoir $p$, according to the heights of the cans passing under the same.

Figure 5:
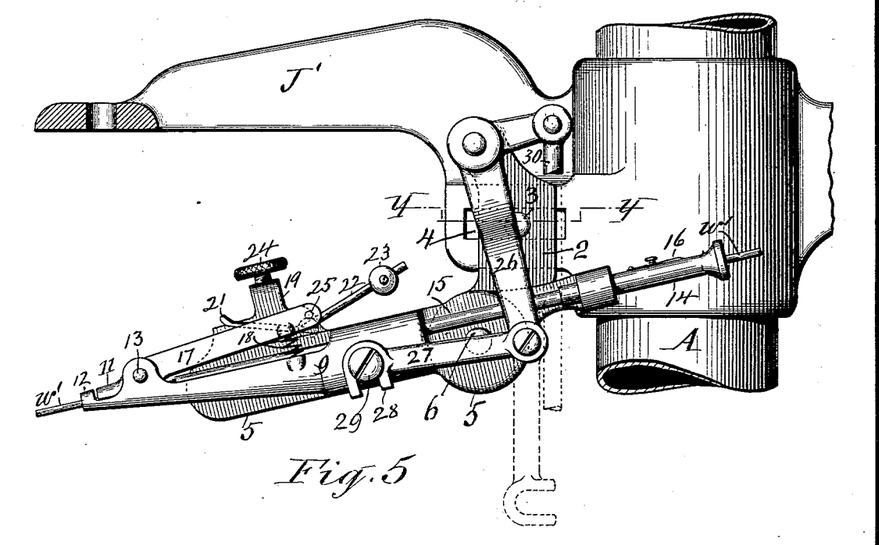
Figs. 5 and 6 are enlarged side views of the mechanism for feeding the solder to the soldering-iron and showing said mechanism in different operative positions.
Figures 6, 10:
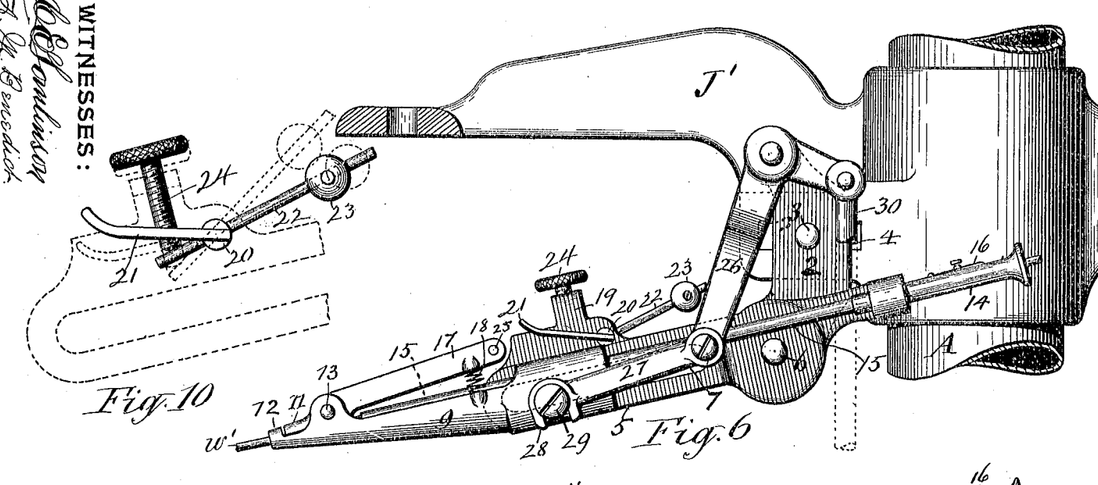
Fig. 10 is a detail view of the means for adjusting the tripper of the solder-gripping jaw.
Figure 7:
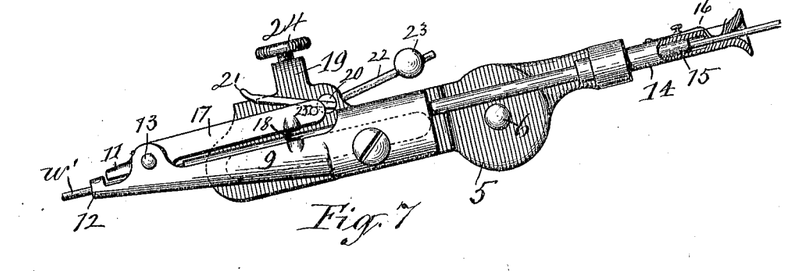
Fig. 7 is a side view of the solder-gripping devices in position for releasing the solder.

$w$ designates the spool upon which the thread $w'$ of solder is wound and from which it is fed to the soldering-iron by means of the following mechanism: To the arm J', adjacent to the column A, is adjustably connected a bracket 2 by means of the attaching-bolt 3 passing through a horizontal slot 4 in the arm J', as shown in Figs. 5 and 6 of the drawings. Said slot allows the solder-feeding mechanism to be set in proper position for supplying solder to irons L of different diameters. On the bracket 2 is clamped an arm 5 by a bolt 6, which, when loosened, allows said arm to be set in different angles of inclination, and thus adjusted to carry the solder-feeding devices in proper position in relation to the soldering-iron L. The arm 5 is provided with a longitudinal slot 7, in which slides a tongue 8 projecting from the side of the solder-supporter 9 of the solder-feeder and retained in the slot by the head of a screw 10, which is secured to said tongue, as more readily seen in Fig. 2 of the drawings. The arm 5 is formed with a rearwardly-extending sleeve 14, in the front end portion of which slides the rear end of a tube 15, as more clearly illustrated in Fig. 7 of the drawings. Said tube extends lengthwise of the feeder 9 and is rigidly secured thereto. The front or free end of said feeder is provided with an eye 12, which is in range with the tube 15.

The solder $w'$ passes through the sleeve 14 and thence through the tube 15 and eye 12. A spring-plate 16 or other suitable brake is connected to the sleeve 14 and made to bear on the solder $w'$, so as to prevent the movement thereof during the movement of the feeder 9 from the soldering-iron, as hereinafter described.

The feeder 9 is provided with a suitable gripper for taking hold of the solder and carrying it along during the movement of said feeder toward the soldering-iron L and releasing the solder during the reverse movement of the feeder. It is obvious that this gripper is susceptible of various modifications in its detail construction, and I therefore do not limit myself to the specific devices shown in the drawings, which, however, illustrate my preferred construction of said device, and it consists of the jaw 11, which is immediately back of the eye 12 on the carrier 9 and is pivoted to said carrier at 13 and provided with a rearwardly-extending lever 17, supported by a spring 18, so as to hold the jaw yieldingly in a closed position. From one side of the free end of the lever 17 projects a pin 25, and the same side of the arm 5 is formed with an upward projection 19, through which passes transversely a short shaft 20. To the end of the shaft adjacent to the feeder 9 is fastened a tongue 21, which extends part way toward the front of said feeder. To the opposite end of the shaft 20 is fastened a lever 22, which is inclined forward and weighted at its rear end, as shown at 23. A set-screw 24 is adjustably connected to the projection 19 and in position to support the lever 21 in its forwardly-inclined position, as specially shown in Fig. 10 of the drawings.

The operation of the solder-feeding mechanism thus far described is as follows: During the reciprocating movement of the feeder 9 it is guided rectilinearly on the arm 5 by the longitudinal slot 7. In the rearward movement of the feeder 9 the pin 25 on the lever 17 passes under the rearwardly-inclined tongue 21, which is sustained in its position by the set-screw 24. Said tongue thereby depresses the lever 17 and causes the same to open the jaw 11, so as to release the solder $w'$, which passes under the jaw. The feeder 9 travels a sufficient distance to carry the pin 25 past the rear end of the tongue 21, and then the spring 18 lifts the lever 17, so as to carry the pin above the tongue. In the succeeding forward movement of the feeder the aforesaid pin traverses the ascending top of the tongue 21, which pries up the lever 17, and thus imparts a downward pressure to the jaw 11, which is thereby caused to grip the solder $w'$ and carry the same along with the feeder 9, so as to bring said solder in contact with the soldering-iron in time for soldering the cap to the can brought under said iron by the mechanisms hereinbefore described. The brake 16 serves to hold the solder so as to prevent its being pushed back during the retrograde movement of the feeder 9. The weight 23 on the lever 22 is adjustable toward and from the fulcrum of said lever, so as to vary the purchase of the lever and cause the tongue 21 to impart the requisite gripping force to the jaw 11. The movement of the jaw can be increased or diminished by the adjustment of the set-screw 24.

Figure 8:
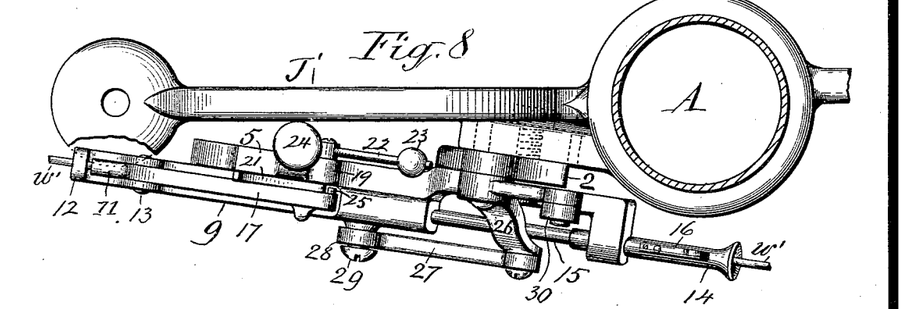
Fig. 8 is a plan view of the mechanism shown in Fig. 5.
Figure 9:
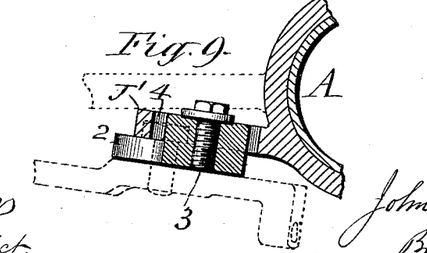
Fig. 9 is a transverse section on line Y Y in Fig. 5.
Figure 11:
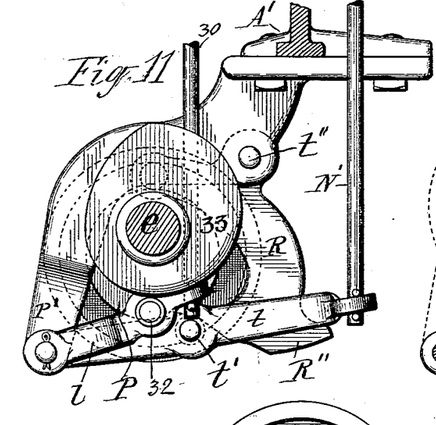
Fig. 11 is an enlarged transverse section on line Q Q in Fig. 1, viewed toward the left side of the figure.

The feeder 9 receives its reciprocating motion through the following mechanisms: To the bracket 2 is pivoted a bell-crank lever 26, one arm of which is connected to the feeder 9 by a pitman 27, as shown in Figs. 5, 6, and 8 of the drawings. To allow said feeder to be thrown out of said connection and leave it dormant for introducing a new supply of solder, I form the pitman 27 with a vertically-disposed fork 28, which straddles the stem of a stud pin or screw 29 attached to the side of the feeder. The other arm of the lever 26 is connected by a rod 30 to one end of a lever, which is pivoted at the opposite end to the bracket P' and has intermediate its length the roller 32, pivoted to the side of the lever and bearing on the periphery of a cam 33 secured to the rotary shaft $e$, as more clearly shown in Fig. 11 of the drawings. A spring 34 surrounding the rod 30 and bearing with its lower end on a lug 45, projecting from the bracket A', and with its upper end on a collar 35, attached to the rod, forces said rod upward, and thereby maintains the roller 32 in contact with the cam 33. The rotation of the cam 33 imparts oscillatory motion to the lever 1, which motion is transmitted to the lever 26, from which a reciprocating movement is transmitted to the feeder 9 by the pitman 27. This movement of the solder-feeder is a very important feature of my invention in that the withdrawal of the solder supporter or guide 9 of said feeder from the soldering-iron after the soldering has been effected prevents the feeder from being held long enough in proximity to the soldering-iron to become heated sufficiently to melt the solder within the eye 12 and clog the same.

To allow the operator to arrest the rotary motion of the turn-table D and the reciprocating motions of the soldering-iron L, solder-feeder 9, and acid-supplier $p$ in case the soldering-iron is not sufficiently heated to melt the solder, I mount the pulley K loosely on shaft $e$ and connect to said shaft by spline and groove a sliding clutch 36, with which is connected an upwardly-projecting arm 37 on a foot-lever 38, pivoted to a suitable support 39 on the column A. A spring 40 connects the free end of the lever 38 to the bracket A' and sustains said lever normally in its elevated position, in which it holds the clutch out of engagement with the pulley, and thus the machine is normally at rest. The machine is set in motion by the operator or person in charge of the machine pressing with his or her foot upon the top of the free end of the lever. A set-screw 41, connected vertically and adjustably to the lever and coming in contact with the base of the column A during the depression of the lever 38, limits the movement of the latter, so as to guard against excessive engagement of the clutch with the pulley in case a friction-clutch is employed.

Another important feature of my invention resides in an automatically-operating device for cleaning the soldering-iron from dross during the operation of the machine. Said cleaner consists, essentially, of a suitable holder 42, preferably of the shape and size of one of the cans to be capped, as represented in Figs. 15 and 16 of the drawings. To this holder are secured elastic arms or springs 43, to the free ends of which are secured wiping-blocks of sal-ammoniac or other suitable material for that purpose. Said blocks are disposed in a circle concentric to the axis of the holder and are sustained normally in a circle of a somewhat smaller diameter than the lower end of the soldering-iron L, which is tapered, and when said iron is depressed while the holder 42 is placed under the tapered end of the revolving soldering-iron the latter enters between the wiping-blocks 44, which are thus caused to remove the dross from said iron. The dross falling into the holder serves to keep the floor around the machine much cleaner.

The holder 42 can be placed at any time upon the turn-table D in place of one of the cans whenever it is found necessary to clean the soldering-iron. Hence the necessity of stopping the machine for said purpose is obviated.

One of the novel features of my invention resides in the arrangement of the cams M, I', and 33 and the eccentric P, all of which are mounted on the same shaft $e$ and actuate, respectively, the turn-table D, can-gripper E, and solder-feeder 9 and bring the soldering-iron and flux or acid supplier $p$ in operative positions on the cans. The motion of said shaft being under control of the person in charge of the machine allows said person to arrest the motions of all the aforesaid parts of the machine whenever he finds that the soldering-iron is not heated sufficiently to melt the solder or other parts are not in proper operative condition.

By practical tests I have found that the described machine requires very little power to drive it and that it can be driven by the power of one man turning a crank 50 attached to the driving-shaft $a$.

What I claim as my invention is—

1. In combination with the can-carrying turn-table and soldering-iron over the same at one side of the center thereof can-supporting jaws upon said table equidistant from the center thereof, and a grip under the front of the soldering-iron and movable radially in relation to the turn-table to press the can against the opposite jaw and thereby confine the can central under the soldering-iron as set forth.

2. In combination with the can-carrying turn-table and soldering-iron over said table at one side of the center thereof, can-supporting jaws upon said table equidistant from the center thereof, a grip movable radially in relation to the turn-table to center the can under the soldering-iron, and a spring-actuated locking-pin on the carrier of the grip entering a socket in the edge of the table as set forth and shown.

3. In combination with the can-carrying turn-table, can-supporting jaws connected to said table adjustably toward and from the center of the table to accommodate cans of different diameters, a rock-arm movable toward and from said table, a slide on said arm, a spring forcing said slide toward the turn-table, and a can-grip secured to said slide as set forth.

4. In combination with a pivoted can-carrying table, a ratchet-wheel fastened to the shaft of said table, a gear-wheel loosely connected to said shaft, a pawl connected directly to said gear-wheel to revolve therewith and engage the ratchet-wheel, an oscillatory lever provided with a segmental gear and imparting oscillatory motion to the aforesaid gear-wheel, and a rotary cam actuating the aforesaid lever as set forth.

5. In combination with the soldering-iron, and pivoted can-carrying table, can-supporting jaws on said table, a rock-arm carrying a can-gripper under the front of the soldering-iron, a ratchet-wheel rigidly attached to the shaft of the aforesaid table, a gear-wheel loosely connected to said shaft a pawl carried on said gear-wheel and engaging the ratchet-wheel, an oscillatory lever provided with a segmental gear engaging the aforesaid gear-wheel, a revoluble shaft, and two cams on said shaft actuating the aforesaid rock-arm and lever as set forth.

6. In a can-capping machine the combination with the vertically-movable soldering-iron and mechanism imparting rotary motion to said iron, the pivoted can-carrying table, lever for raising and lowering the soldering-iron, and the solder-feeder, a rotary shaft, an eccentric and cams mounted on said shaft and transmitting motion to the aforesaid table, lever and solder-feeder independent of the rotary motion of the soldering-iron, a driving-pulley mounted loosely on said shaft, a clutch locking and unlocking said pulley to and from the shaft, and a manually-controlled lever shifting the clutch substantially as set forth.

7. In combination with the vertically-movable soldering-iron, pivoted can-carrying table and can-supporting jaws on said table, a rock-arm carrying a can-gripper under the front of the soldering-iron, a solder-feeder movable toward and from the soldering-iron, a revoluble shaft, an eccentric and three cams all mounted on said shaft and actuating respectively the soldering-iron and the aforesaid table, rock-arm and solder-feeder, the driving-pulley mounted loosely on said shaft, a clutch sliding on said shaft to engage and release the pulley, and a manually-controlled lever moving the clutch as set forth.

8. In a can-capping machine the supporting-frame consisting of a hollow column having brackets and arms extending from it, the can-carrying table and soldering-iron mounted on said frame, the oil-tank housed in the aforesaid column in combination with the burner for heating the soldering-iron and a pipe leading from said tank to the burner as set forth.

9. In combination, with the soldering-iron and supporting-frame, a guide secured to the frame and extending toward the soldering-iron, a solder-feeder sliding in said guide and carrying the thread of solder, an intermittently-operated gripper on the feeder engaging and releasing the solder respectively during the forward and rearward movement of the feeder, and mechanism transmitting reciprocating motion to said feeder as set forth.

10. In combination, with the soldering-iron and supporting-frame, a guide supported on said frame adjustably to different angles of inclination toward the soldering-iron, a solder-feeder sliding on said guide and mechanism transmitting intermittent reciprocating motion to said feeder as set forth.

11. In combination with the soldering-iron and supporting-frame, a guide connected to the frame adjustable toward and from the soldering-iron, a solder-feeder sliding in said guide, and mechanism transmitting intermittent reciprocating motion to said feeder as set forth.

12. In combination with the soldering-iron and supporting-frame, a guide extending from the frame toward the soldering-iron, a solder-feeder sliding in said guide and provided with a solder gripping and releasing jaw, a lever extending from said jaw, an inclined tongue in the path of said lever to actuate the same during the movement of said feeder, and mechanism transmitting intermittent reciprocating movement to the feeder as set forth.

13. In combination with the soldering-iron and supporting-frame, a guide extending from the frame toward the soldering-iron, a solder-feeder sliding in said guide, a solder-gripper pivoted to said feeder, mechanisms opening and closing the gripper during the movement of the feeder, a brake on said feeder engaging the solder to prevent retrograde movement thereof, and mechanism transmitting intermittent reciprocating motion to the feeder as set forth.

14. In combination with the soldering-iron and supporting-frame, a guide-arm extending from the frame toward the soldering-iron, a solder-feeder sliding in said arm, a solder-gripper pivoted to said feeder and carrying the thread of solder, a lever extending from said gripper, a spring supporting the free end of the lever, a pin projecting from the side of said lever, a tongue pivoted to the guide-arm and in the path of the aforesaid pin, a lever attached to the axis of said tongue and weighted at one end, a set-screw adjustably supporting said lever and mechanism transmitting motion to said feeder as set forth.

15. In combination with the soldering-iron and supporting-frame, a guide-arm extending from the frame toward the soldering-iron, a solder-feeder sliding on said arm, a solder-gripper pivoted to the feeder adjacent to the discharge end thereof, a solder-guiding tube on the feeder leading to the gripper, a stationary tube attached to the aforesaid guide-arm and receiving in it the rear end of the aforesaid guiding-tube, a brake connected to the stationary tube and bearing on the solder passing through said tube, a lever extending rearward from the gripper, a spring supporting the free end of said lever, a tongue pivoted to the guide-arm, a lever connected to the axis of said tongue and weighted at one end, a set-screw adjustably sustaining the aforesaid tongue inclined longitudinally, and a pin projecting from the side of the free end of the lever and in position to encounter the tongue and mechanism transmitting reciprocating motion to the said solder-feeder as set forth.

16. In combination with the supporting-frame and soldering-iron, a guide-arm extended from the frame toward the soldering-iron, a solder-feeder sliding in said arm, a bell-crank lever pivoted to the frame and connected at one end to the solder-feeder, a pitman connected to the opposite end of said lever, a rotary shaft, a cam attached to said shaft, and a lever receiving oscillatory motion from said cam and connected to the aforesaid pitman as set forth.

17. In combination with the supporting-frame, vertically-movable soldering-iron and a lever fulcrumed on the top portion of said frame and connected at one end to the shaft of the soldering-iron, a rotary shaft, an eccentric fixed to the latter shaft, a rock-arm pivoted to the frame and actuated by the eccentric and formed at its free end with a prolonged base disposed at an angle inclined to a line drawn radially from the pivot of said rock-arm, a lever pivoted at one end to the frame, a roller pivoted to said lever under the base of the rock-arm, and a rod connecting the opposite end of said lever to the aforesaid upper lever as set forth and shown.

18. In combination with the driving-shaft, soldering-iron and burner for heating said iron, a pipe conveying oil to said burner, an air-supplying pipe intersecting the oil-pipe, an air-pump connected to said air-pipe, an eccentric on the driving-shaft, a lever actuated by said eccentric, and a rod connecting said lever to the piston of the pump as set forth.

19. In combination with the soldering-iron and table carrying the cans to said iron, a vertical rod journaled in bearings on the frame above the table, mechanism transmitting rotary motion to said rod, a lever receiving oscillatory motion from the actuating mechanism of the machine and imparting reciprocating motion to the aforesaid rod and an acid-supplier connected to said vertical rod substantially as and for the purpose set forth.

20. In combination with the soldering-iron and can-carrying table, a vertical rod journaled in bearings on the frame, a wheel attached to said rod and receiving rotary motion from the actuating mechanism of the machine, a lever pivoted to the frame and connected at one end to the aforesaid rod, a rotary shaft, a cam attached to said shaft, a lever receiving oscillatory motion from said cam, a rod connecting the two levers, and an acid-supplier attached to the lower end of the aforesaid rod as set forth.

21. In combination with the vertically-movable soldering-iron and table carrying the cans in upright positions toward said iron, a flux-reservoir supported revolubly in a vertical position over said table and movable toward and from the same and provided with discharge-openings at opposite sides of the center of its lower end, and mechanism transmitting rotary motion to said reservoir as set forth.

22. In combination with the vertically-movable soldering-iron, and table carrying the cans in upright positions toward said iron, a flux-reservoir supported revolubly in a vertical position over said table and movable toward and from the same and provided with discharge-openings at opposite sides of the center of its lower end, and mechanism transmitting rotary motion to said reservoir, and wicks passing through said openings as set forth.

23. In combination with the soldering-iron and can-carrying table, a vertical rod movable longitudinally over said table and screw-threaded on its lower end, an acid-reservoir receiving said rod through it and provided with an orifice in the center of its bottom and with ducts through the edges of said orifice, wicks passing through said ducts, and a stopper screwed on the lower end of the rod to close the aforesaid orifice and having its periphery tapered upward to pinch the wicks as set forth.

24. In combination with the soldering-iron and can-carrying table, a vertical tubular rod movable longitudinally over the table, an acid-reservoir attached to the lower end of said rod and provided with discharge-ducts in its bottom, a rod passing longitudinally through said tubular rod and protruding at the lower end thereof and a stop on the upper end of the internal rod to limit the downward movement thereof as set forth and shown.

25. In combination with the rotary and vertically-movable soldering-iron and can-carrying table, an apparatus for cleaning said iron consisting of a holder seated removably on said table, elastic arms attached to said holder, and blocks of sal-ammoniac supported by said arms in a circle concentric to the axis of the soldering-iron as set forth.

26. In combination with the rotary and vertically-reciprocating soldering-iron and the table carrying the cans to said iron, a can-shaped holder for receiving the dross from the soldering-iron, spring-arms attached to said can-shaped holder, and blocks of sal-ammoniac attached to the free ends of said arms and supported thereby in a circle of a smaller diameter than the lower end of the soldering-iron substantially as described and shown.

27. In combination with the vertically-movable soldering-iron and can-carrying table, a holder seated removably on said table to pass under the soldering-iron, springs attached to said holder, and blocks of sal-ammoniac secured to said springs and pressed thereby in contact with the soldering-iron substantially as and for the purpose set forth.

In testimony whereof I have hereunto signed my name this 19th day of April, 1895.

JOHN R. ROWLANDS. [L. S.]

Witnesses:
  JOHN J. LAASS,
  C. L. BENDIXON.